United States Patent [19]
Berthelot et al.

[11] 3,885,208
[45] May 20, 1975

[54] DEVICE FOR AUTOMATIC THERMOCHEMICAL ANALYSIS

[75] Inventors: Guy Berthelot, Ivry; Philippe Guillot, Versailles; Jean-Jacques Perez, Chatillon, all of France

[73] Assignee: Commissarariat a L'Energie Atomique, Paris, France

[22] Filed: Sept. 17, 1973

[21] Appl. No.: 397,728

[30] Foreign Application Priority Data
Oct. 2, 1972   France .................. 72.34888

[52] U.S. Cl. .............................. 318/625; 318/641
[51] Int. Cl. ................................ G05b 11/32
[58] Field of Search ................ 318/625, 641

[56] References Cited
UNITED STATES PATENTS

| | | | |
|---|---|---|---|
| 2,979,596 | 4/1961 | Karp ........................ | 318/641 X |
| 3,098,957 | 7/1963 | Thompson et al. ......... | 318/625 X |
| 3,231,802 | 1/1966 | Myers ....................... | 318/641 X |

Primary Examiner—B. Dobeck
Attorney, Agent, or Firm—Cameron, Kerkam, Sutton, Stowell & Stowell

[57] ABSTRACT

Automatic thermochemical analysis of the concentration of chemical substances in solution is carried out by means of a device comprising a temperature detector which delivers a linear voltage as a function of the temperature of the solution, an electronic summation device controlled by the linear voltage of the detector, one servomechanism for the initial zero-resetting of the summation device and another servomechanism for zero-resetting the unbalance voltage which is measured at absolute value at the output of the summation device, an amplifier for amplifying the output voltage of the summation device which is applied to the servomechanisms, a programmer for the sequential starting of the servomechanisms, a reverser which is inserted in the second servomechanism and controls the direction of the thermochemical reaction of the solution.

6 Claims, 1 Drawing Figure

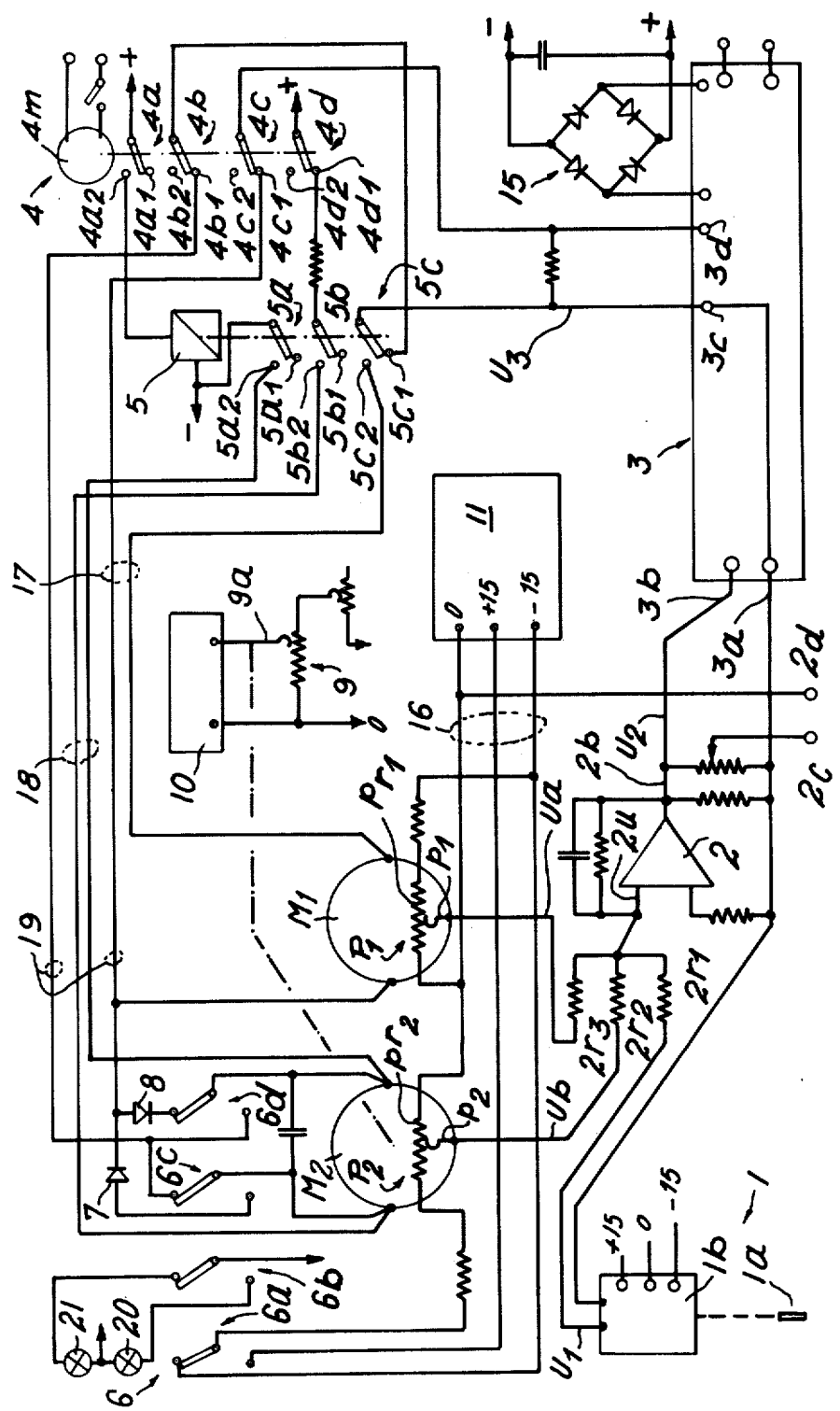

3,885,208

DEVICE FOR AUTOMATIC THERMOCHEMICAL ANALYSIS

This invention relates to devices for measuring the concentration of certain chemical substances in solution at the time of occurence of thermochemical reactions.

Devices have already been employed in the prior art for measuring the concentration of solution by carrying out successive measurements of their initial temperature and then their final temperature with a view to determining the variation in concentration of the chemical element to be analyzed. The temperature difference, which may be either positive or negative, is calculated by means of these two data.

Fully electronic equipment units have already been employed in order to perform rapid recording of these data. The disadvantage of these units lies in their high cost price and in the sensitivity of the storage devices to the environment.

One aim of the present invention is to overcome the above-mentioned drawbacks by making use of conventional servomechanisms, electronic an electromechanical components. A further object of the invention is to meet the requirements of enthalpimetric measurements an thermochemical titration.

This invention is concerned with a device for automatic thermochemical analysis which is characterized in that it comprises in combination:

a temperature detector which delivers a linear voltage as a function of the temperature of the solution, an electronic summation device controlled by the linear voltage of the detector, two servomechanisms, the first servomechanism being employed for the initial zero-resetting of the summation device and the second servomechanism being employed for zero-resetting the unbalance voltage which is measured at absolute value at the output of the summation device, an amplifier which amplifies the output voltage of the summation device, said voltage being applied to the servomechanisms, a programmer for the sequential starting of the servomechanisms, a reverser for controlling the direction of the thermochemical reaction of the solution, said reverser being inserted in the second servomechanism.

The measurement of the temperature variation of a solution as a result of an endothermic or exothermic reaction must take account of the initial ambient temperature of said solution and it is accordingly necessary to adapt the measuring device to an initial zero or reference temperature.

In accordance with one advantageous and characteristic feature of the invention, one sequence of the programmer applies the output voltage of the summation device to the motor of the first servomechanism, said motor controls the initial zero-resetting of the summation device, said programmer also applies the output voltage of the summation device to the motor of the second servomechanism, said second motor controls the zero-resetting of the unbalance voltage of the summation device.

Once the initial zero-resetting of the device has been performed, said device is then ready to carry out the measurement of the temperature variation of the solution.

In accordance with a further characteristic feature of the invention, another sequence of the programmer disconnects the motor of the first servomechanism and applies the unbalance voltage of the summation device to the motor of the second servomechanism.

In order to store the initial zero-resets performed by the motors, these latter are coupled mechanically to potentiometers. Storage of the voltage to be delivered to the summation device in order to reduce the unbalance voltage to zero is obtained by means of a recopy potentiometer which is coupled mechanically to the motor of the second servomechanism.

A better understanding of the invention will be obtained from a perusal of the following detailed description and from a study of the single FIGURE of the accompanying drawing in which a preferred embodiment of the invention is illustrated diagrammatically and by way of non-limitative example.

As shown in the figure, the analyzer in accordance with the invention is essentially made up of a detector 1 consisting of a probe $1a$ and a preamplifier $1b$. The temperature detector 1 delivers a linear potential difference $u_1$ as a function of temperature. This voltage is applied to the input of a resistor $2r_1$ of an electronic summation device 2 of a type known per se. Said input comprises resistors $2r_2$ and $2r_3$ and these latter determine in conjuction with the negative feedback resistor of the assembly the amplification factor of the summation device which attains 100 in the present example. The output $2b$ of the summation device 2 is connected to the terminals $3a$, $3b$ of an amplifier 3 for logical servomechanisms which are fed from a direct-current supply 15 (outputs designated by the arrows + and −).

The servomechanism unit comprises a programmer 4, a relay 5, motors $M_1$, $M_2$. The programmer 4 comprises contacts such as $4a$, $4a_1$, $4a_2$, etc... which are controlled by an auxiliary motor $4m$.

The motors $M_1$ and $M_2$ are coupled mechanically to the sliders $P_1$, $P_2$ of potentiometers designated as $P_1$, $P_2$ respectively, the resistors $pr_1$ and $pr_2$ of said potentiometers being inserted in the lines 16 of a zero-potential circuit which is connected to the terminals of the supply 11. The motor $M_2$ is also connected to the slider $9a$ of a recopy potentiometer 9. A digital voltmeter 10 is connected between the zero potential and the slider $9a$.

The motor $M_1$ is connected through the lines 17, the contacts $5c$, $5c_2$ of the relay 5 and the contacts $4c$, $4c_1$ (still in the non-operating position) of the programmer 4 to the terminals $3a$, $3b$ of the amplifier 3. The motor $M_2$ is also connected through the lines 18, the contacts $5a$, $5a_2$ and $5b$, $5b_2$ of the relay 5 and the contacts $4d$ and $4d_1$ (still in the non-operating position) of the programmer 4. The motor $M_2$ is also connected to the contact $6c$, $6d$ of a reverser 6.

The slider $pc_1$ and $pc_2$ of the potentiometers $P_1$, $P_2$ are connected respectively to the input resistors $2r_2$, $2r_3$ of the summation device 2.

Energization of the relay 5 is obtained by closure of the contacts $4a$, $4a_2$ of the programmer 4. The reverser is manually operated and placed at the disposal of the operator so as to determine the direction of variation of temperature of the solution which is either exothermic or endothermic. To this end, diodes 7 and 8 inserted in a circuit for reversing the motor $M_2$ serve to reverse the direction of rotation of this latter. The contacts $6a$ to $6d$ control signal lamps 20, 21 which indicate the direction of the reaction.

The operation of the device is as follows : at the beginning of the analysis, the sequences are determined by the starting-up of the motor $4m$ of the programmer 4, the initial or ambient temperature of the solution is detected by the detector 1 which delivers a linear potential difference $u_1$ as function of said temperature.

The voltage $u_1$ is applied to the input of the summation device which delivers an output voltage $u_2$ with an amplification factor which is imposed by the input resistors $2r_1$ to $2r_3$ and by the negative feedback resistor of the summation unit. It is known that the output voltage $u_2$ of the summation unit is equal to the algebraic sum of the input voltages of said unit. The output voltage $u_2$ is applied to the input terminals $3a$, $3b$ of the amplifier 3 which returns an amplified voltage $u_3$ to its terminals $3c$, $3d$, said amplified voltage being applied to the terminals of the motor $M_1$ by means of the contacts $4c$ and $4c_1$ of the programmer and the contacts $5c$ and $5c_2$ of the relay 5.

The motor $M_1$ rotates and displaces the slider $p_1$ of the potentiometer $P_1$ until its terminal voltage is equal at absolute value to that of the detector 1. This condition is possible only in the case of a zero voltage at the terminals of the potentiometer $P_2$ of the motor $M_2$. Accordingly, the output voltage $u_3$ of the amplifier 3 is also applied through the contacts of the relay 5 to the motor $M_2$ which brings the slider $p_2$ back against its stop.

The potential difference collected from the slider $p_1$ is applied to the input of the resistor $2r_3$ of the summation device 2 until there is obtained an output voltage $u_2 = u_1 + (-u_a) + u_b = 0$, where $u_b$ is equal to zero, which corresponds to initial zero-resetting of the device.

The above-mentioned condition of zero-resetting as a function of the ambient temperature makes it possible to carry out a measurement of temperature variation at the level of the detector 1 which corresponds to the thermochemical reaction of the solution.

The temperature variation aforesaid is represented by a positive or negative unbalance voltage $u_2$ which appears at the output of the summation device 2. This voltage is applied to the motor $M_2$ as a result of a reversal of the contacts of the pogrammer. At the same time, the programmer de-energizes the relay 5, the contacts of which open the excitation circuit of the motor $M_2$. The motor $M_2$ displaces the slider $p_2$ which indicates a voltage ub of opposite sign to that of the detector 1 in order to effect compensation for the unbalance voltage of the summation device 2.

There is thus obtained $u_2 = u_1 + (-u_a) + \delta$, where $\delta$ is the detected temperature difference.

The reverser 6 serves to detect the minimum and maximum values of the temperature variation corresponding to the thermochemical analysis which is being performed. It is possible by means of the reverser and prior to any manipulation, to select either a negative or a positive voltage to be delivered to the input of the summation device 2 which is a function of the exothermic or endothermic reaction. The diodes 7 and 8 which are inserted in the lines 19 prevent the motor $M_2$ from rotating in the direction opposite to the preselected reaction (exothermic or endothermic) by blocking the unbalance voltage $u_2$ on the motor.

A variation of temperature at the level of the detector 1 of the probe therefore corresponds to a certain angle of rotation of the motor $M_2$ at the time of thermochemical analysis. In order to present an item of information as a measured value, the recopy potentiometer 9 gives directly the value of the voltage applied to said terminals.

The digital voltmeter 10 which is connected to ther terminals of the potentiometer 9 gives a direct reading of the maximum or minimum value attained by the temperature of thermochemical reaction of the solution.

The analyzer in accordance with the present invention permits a further possibility in that an item of information which is necessary for the thermochemical titration process can be made available so as to ensure stopping of said titration by the first curve derivative with the aid of a device (not shown) which does not form part of the invention. This information is collected from the output terminals $2c$, $2cd$, of the summation device 2.

What we claim is:

1. A device for the automatic thermochemical analysis of the concentration of chemical substances in solution, wherein said device comprises in combination:

a temperature detector which delivers a linear voltage as a function of the temperature of the solution, an elctronic summation device controlled by the linear voltage of the detector, two servomechanisms, the first servomechanism being employed for the initial zero-resetting of the summation device and the second servomechanism being employed for zero-resetting the unbalance voltage which is measured at absolute value at the output of the summation device, an amplifier which amplifies the output voltage of the summation device, said voltage being applied to the servomechanisms, a programmer for the sequential starting of the servomechanisms, a reverser for controlling the direction of the thermochemical reaction of the solution, said reverser being inserted in the second servomechanism.

2. A device according to claim 1, wherein one sequence of the programmer applies the output voltage of the summation device to the motor of the first servomechanism, said motor controls the initial zero-resetting of the summation device, said programmer also applies the output voltage of the summation device to the motor of the second servomechanism, said second motor controls the zero-resetting of the unbalance voltage of the summation device.

3. A device according to claim 1, wherein another sequence of the programmer disconnects the motor of the first servomechanism and applies the unbalance voltage of the summation device to the motor of the second servomechanism.

4. A device according to claim 2, wherein the motor of the first servomechanism is coupled mechanically to a potentiometer for initial zero-resetting.

5. A device according to claim 2, wherein the motor of the second servomechanism is coupled mechanically to a potentiometer for zero-resetting the unbalance voltage of the summation device and to a recopy potentiometer.

6. A device according to claim 1, wherein the reverser comprises a switch and a diode circuit for reversing the input voltage applied to the summation device which controls the motor of the second servomechanism.

* * * * *